United States Patent
Tochigi et al.

(10) Patent No.: US 11,971,116 B2
(45) Date of Patent: Apr. 30, 2024

(54) ROTARY-TYPE VALVE DEVICE

(71) Applicant: MIKUNI CORPORATION, Tokyo (JP)

(72) Inventors: Yasuhiro Tochigi, Kanagawa (JP); Shoichi Ishiguchi, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 56 days.

(21) Appl. No.: 17/344,985

(22) Filed: Jun. 11, 2021

(65) Prior Publication Data

US 2022/0034411 A1   Feb. 3, 2022

(30) Foreign Application Priority Data

Jul. 29, 2020  (JP) ................................ 2020-128094

(51) Int. Cl.
| | |
|---|---|
| *F16K 5/04* | (2006.01) |
| *F01P 7/14* | (2006.01) |
| *F16K 27/06* | (2006.01) |

(52) U.S. Cl.
CPC .............. *F16K 5/0442* (2013.01); *F01P 7/14* (2013.01); *F16K 5/0407* (2013.01);
(Continued)

(58) Field of Classification Search
CPC .... F16K 5/0407; F16K 5/0414; F16K 5/0442; F16K 5/0485; F16K 5/0605; F16K 5/061;
(Continued)

(56) References Cited

U.S. PATENT DOCUMENTS

| 2,503,639 A | 4/1950 | Snyder |
| 2,593,527 A * | 4/1952 | Berck ................... F16K 5/0414 |
| | | 251/287 |

(Continued)

FOREIGN PATENT DOCUMENTS

| DE | 102009035349 | 2/2011 |
| DE | 102017215194 | 2/2019 |

(Continued)

OTHER PUBLICATIONS

"Search Report of Europe Counterpart Application", issued on Dec. 10, 2021, p. 1-p. 12.

*Primary Examiner* — Hailey K. Do
(74) *Attorney, Agent, or Firm* — JCIPRNET

(57) ABSTRACT

A rotary-type valve device is provided, and includes: a tubular valve having an inner passage Ip and opening parts opened in an outer circumferential wall and rotating about a predetermined axial line a shaft rotating integrally with the valve, a housing accommodating the valve, supporting the shaft to be able to turn, and defining a communication port causing the inner passage to communicate with outside; a passage member assembled in the housing such that that the passage member abuts on an outer circumferential wall of the valve and defining a radial-direction passage. The valve includes a recessed part in the axial line direction and surrounding one end part of the shaft. The housing includes a tube part inserted into the recessed part and supporting the one end part and a support hole supporting the other end part of the shaft.

8 Claims, 15 Drawing Sheets

(52) U.S. Cl.
CPC .......... *F16K 5/0485* (2013.01); *F16K 27/065* (2013.01); *F01P 2007/146* (2013.01)

(58) Field of Classification Search
CPC .... F16K 5/0647; F16K 5/0694; F16K 5/0207; F16K 5/0214; F16K 5/0242; F16K 5/0285; F16K 27/065; F16K 27/067; F16K 11/083; F16K 11/0836; F16K 11/085; F16K 11/0853; F16K 11/0856; F16K 11/087; F16K 11/0873; F16K 11/0876; F01P 7/14; F01P 2007/146
See application file for complete search history.

(56) References Cited

U.S. PATENT DOCUMENTS

| | | | | |
|---|---|---|---|---|
| 5,820,133 | A * | 10/1998 | Altshuler | F16K 11/0856 277/630 |
| 9,897,217 | B2 * | 2/2018 | Greene | F16K 5/201 |
| 9,945,283 | B2 * | 4/2018 | Muizelaar | F16K 31/042 |
| 10,227,987 | B2 * | 3/2019 | Hill | F16K 11/0856 |
| 10,458,562 | B2 * | 10/2019 | Ozeki | F16K 31/041 |
| 10,494,983 | B2 * | 12/2019 | Morota | F16K 17/38 |
| 10,626,784 | B2 * | 4/2020 | Akase | F16K 25/005 |
| 10,808,856 | B2 * | 10/2020 | Shen | F01P 3/20 |
| 10,968,810 | B2 * | 4/2021 | Zhou | F04D 29/406 |
| 11,022,023 | B2 * | 6/2021 | Yi | F16K 3/26 |
| 11,149,627 | B2 * | 10/2021 | Sano | F01P 7/14 |
| 11,280,252 | B2 * | 3/2022 | Yoshimura | F01P 7/165 |
| 2017/0009894 | A1 | 1/2017 | Seko et al. | |
| 2021/0291621 | A1 * | 9/2021 | Ozeki | F16K 11/0856 |

FOREIGN PATENT DOCUMENTS

| | | |
|---|---|---|
| DE | 102021100589 A1 * | 7/2022 |
| JP | 2019138354 | 8/2019 |

* cited by examiner

ROTARY-TYPE VALVE DEVICE

CROSS REFERENCE TO RELATED APPLICATIONS

This application claims the priority benefit of Japanese Patent Application No. 2020-128094, filed on Jul. 29, 2020. The entirety of the above-mentioned patent application is hereby incorporated by reference herein and made a part of this specification.

BACKGROUND

Technical Field

The disclosure relates to a rotary-type valve device that opens and closes a passage for a fluid by causing a valve to rotate about an axial line and particularly to a rotary-type valve device that is applied to control of a flow of cooling water for an engine mounted in a vehicle or the like.

Description of Related Art

As a rotary-type valve device in the related art, a cooling water control valve device that includes a housing that has a tube part inside which cooling water can be distributed, a tubular valve that has an opening part in an outer wall and rotates about an axial line, a shaft that is fitted and fixed to the valve, extends on the axial line, and is made of metal, a tubular sealing member that is interposed between the valve and the housing and abuts on an outer circumferential surface of the valve, a motor that drives and rotates the valve, and the like is known (see Patent Document 1 (Japanese Patent Application Laid-Open No. 2019-138354), for example).

In the device, the shaft is formed to have a length extending from both ends of the valve in an axial direction, and both end parts of the shaft are supported by the housing via a bearing such that the shaft is able to turn.

Such a structure leads to an increase in dimension of the housing in the axial direction of the shaft and thus an increase in the device in size. This is thus disadvantageous in terms of vehicle mounting properties in a case in which the device is attached to an engine mounted in a vehicle.

Also, since the valve, the shaft, a bearing that supports both the end parts of the shaft, and the like are formed as independent components, the number of components is large, and the structure becomes complicated, which is disadvantageous in terms of assembly properties, management costs, and the like.

SUMMARY

The disclosure provides a rotary-type valve device capable of reducing the number of components, achieving size reduction of the device, improving vehicle mounting properties, and the like.

According to an embodiment of the disclosure, there is provided a rotary-type valve device including: a tubular valve that includes an inner passage and opening parts that are opened in an outer circumferential wall from the inner passage toward an outward side in a radial direction and that rotates about a predetermined axial line; a shaft that rotates integrally with the valve; a housing that accommodates the valve, supports the shaft such that the shaft is able to turn, and defines a communication port that causes the inner passage to communicate with an outside; and a passage member that is assembled in the housing such that the passage member abuts on an outer circumferential wall of the valve and defines a passage in the radial direction, in which the valve includes a recessed part that is recessed inward from one end surface in a direction of the axial line and surrounds one end part of the shaft, and the housing includes a tube part that is inserted into the recessed part and supports the one end part of the shaft and a support hole that supports the other end part of the shaft in a region near the communication port.

DESCRIPTION OF THE EMBODIMENTS

Hereinafter, an embodiment of a rotary-type valve device according to the present disclosure will be described with reference to the accompanying drawings.

Figure 1:
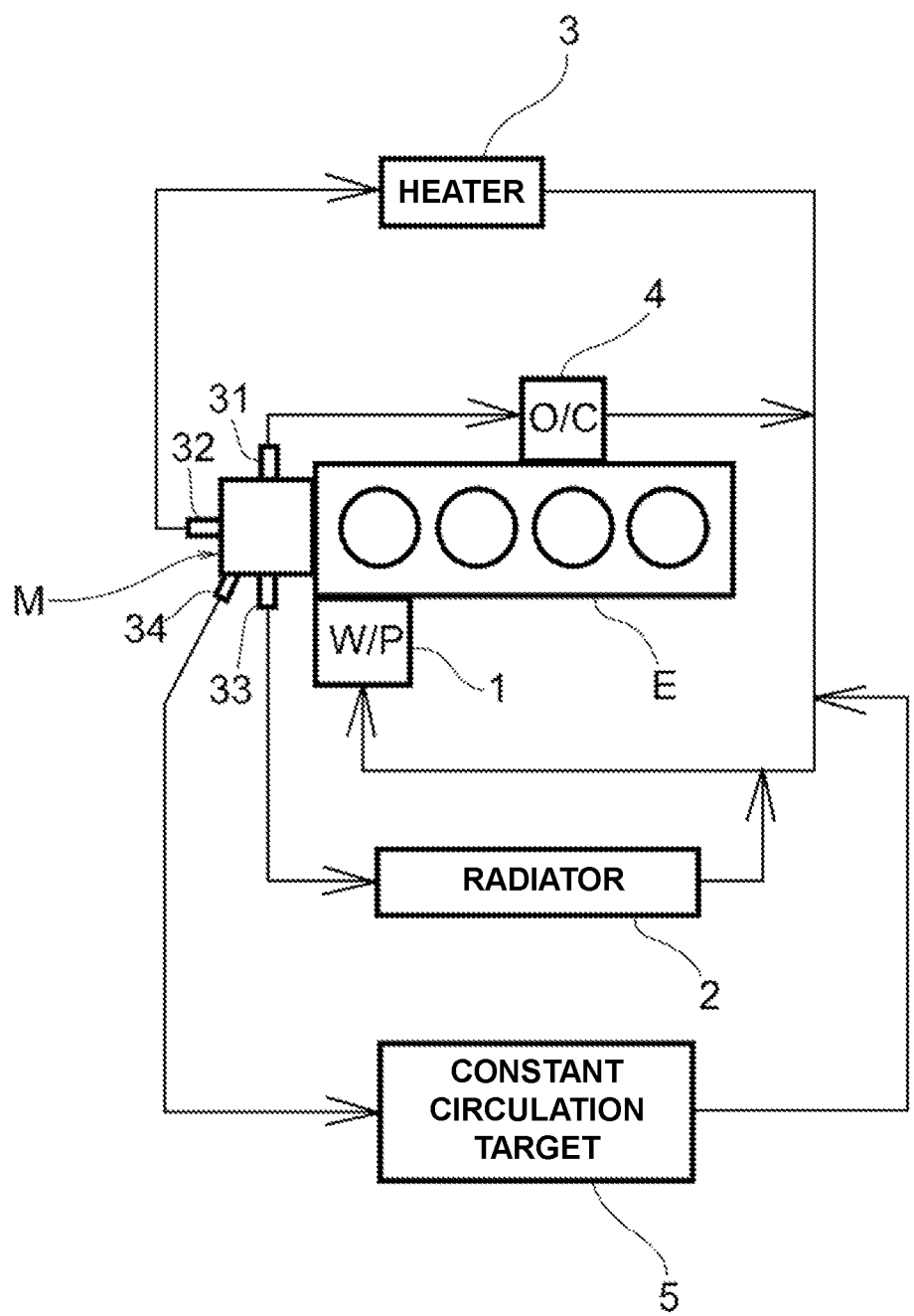
FIG. 1 a block diagram illustrating a state in which a rotary-type valve device according to the disclosure is applied to a cooling water circulation system for an engine.

A rotary-type valve device M according to an embodiment is attached to an engine E mounted in a vehicle on a downstream side of a water pump 1 and is disposed to supply cooling water to a radiator 2, a heater 3, an oil cooler 4, and constant circulation targets 5, as illustrated in FIG. 1.

Also, as the constant circulation targets 5, a throttle body, an EGR valve, and the like are targets.

The rotary-type valve device M includes a housing main body 10 and a coupling member 20 that serve as a housing H, connector members 31, 32, 33, and 34, a valve 40 that turns around an axial line S, three passage modules m1, m2, and m3, and a drive unit 80 as illustrated in FIGS. 2, 3, 6, 8, and 9.

Each of the three passage modules m1, m2, and m3 is configured with a passage member 50, a sealing member 60, and a biasing spring 70.

Also, the passage members 50, the sealing members 60, and the biasing springs 70 configuring the three passage modules m1, m2, and m3 are different only in dimensions, and otherwise have the same configuration, and will thus be represented using the same reference signs.

Figure 4:
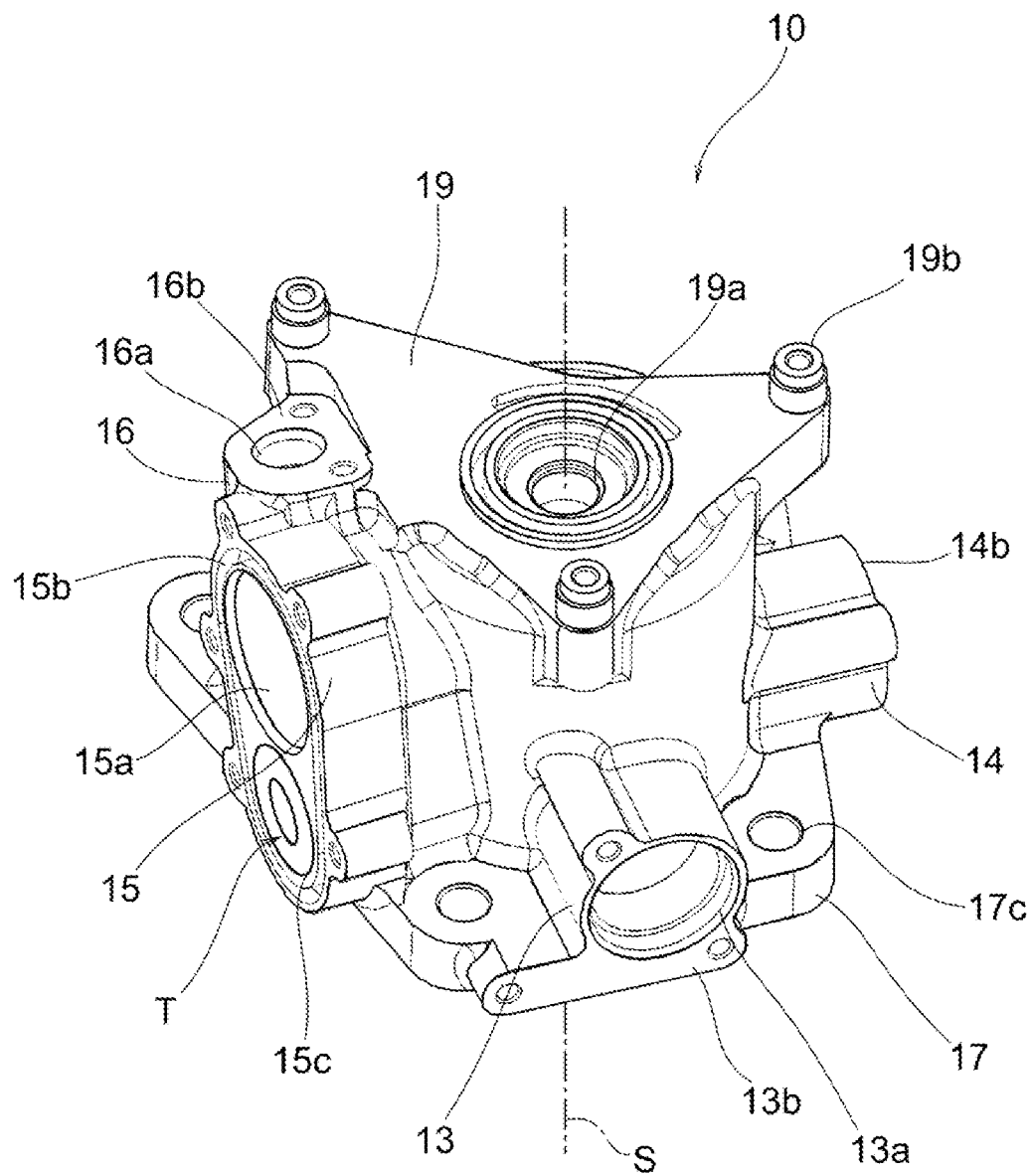
FIG. 4 is an exterior perspective view illustrating the housing included in the rotary-type valve device according to an embodiment.
Figure 6:
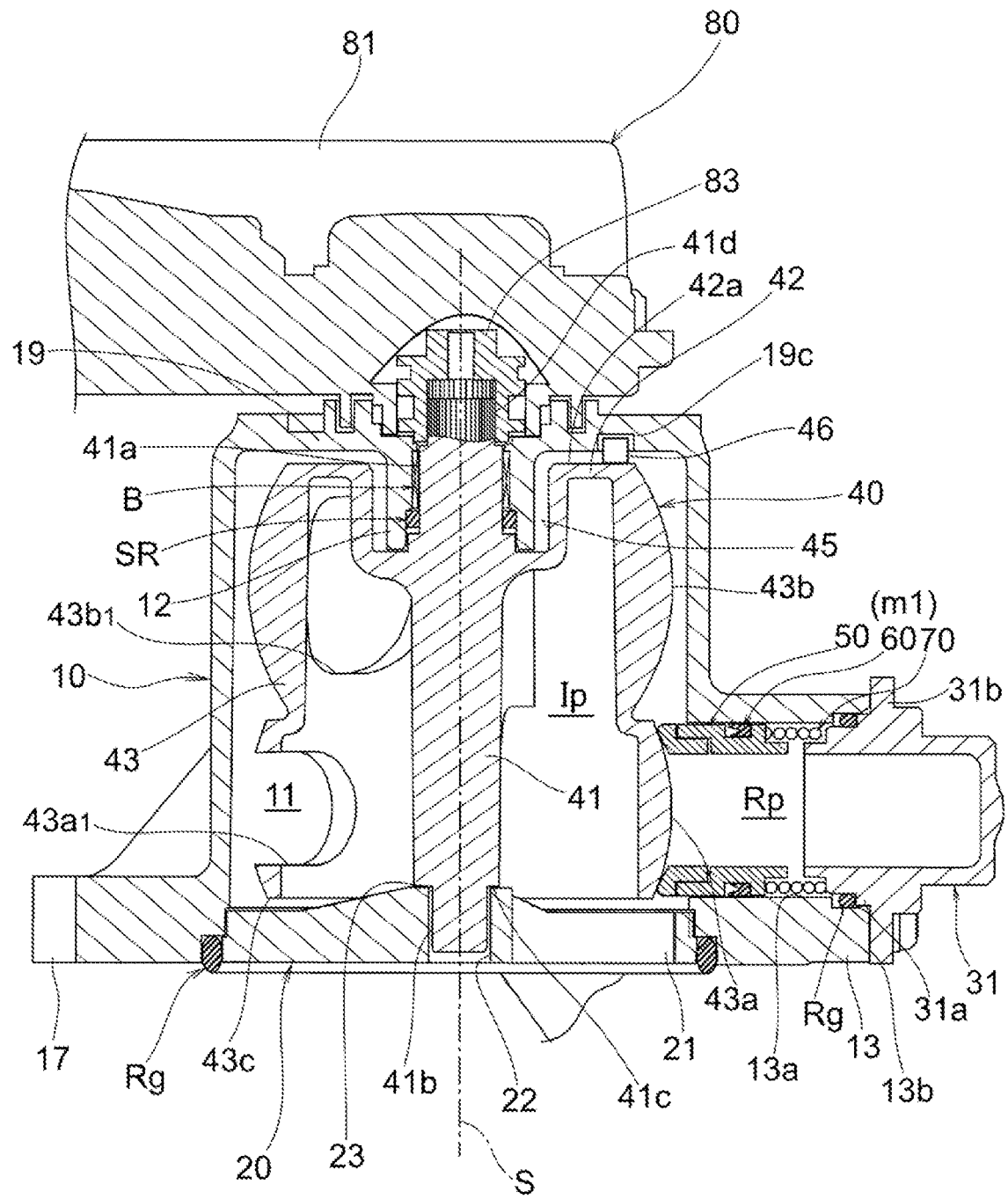
FIG. 6 is a sectional view of the rotary-type valve device along a plane including the axial line, according to the embodiment.

The housing main body 10 is formed using a resin material, an aluminum material, or the like and includes an accommodation chamber 11, a tubular part 12 that projects to the inside of the accommodation chamber 11, four coupling and fitting parts 13, 14, 15, and 16, a flange part 17, a fitting recessed part 18, and a partitioning wall 19 to which the drive unit 80 is attached on the outward side as illustrated in FIGS. 4 and 6.

The accommodation chamber 11 is formed into a cylindrical shape around the axial line S and accommodates the valve 40 in a clearance such that the valve 40 can turn around the axial line S.

The tubular part 12 is formed into a cylindrical shape around the axial line S and is formed to project inward from the partitioning wall 19 in the direction of the axial line S.

Also, the tubular part 12 supports one end part 41a of a shaft 41 of the valve 40 via a bearing bush B such that the shaft 41 can turn as illustrated in FIG. 6. Moreover, a sealing member SR is disposed on an inward side in the direction of the axial line S from the bearing bush B between the tubular part 12 and the shaft 41.

Figure 8:
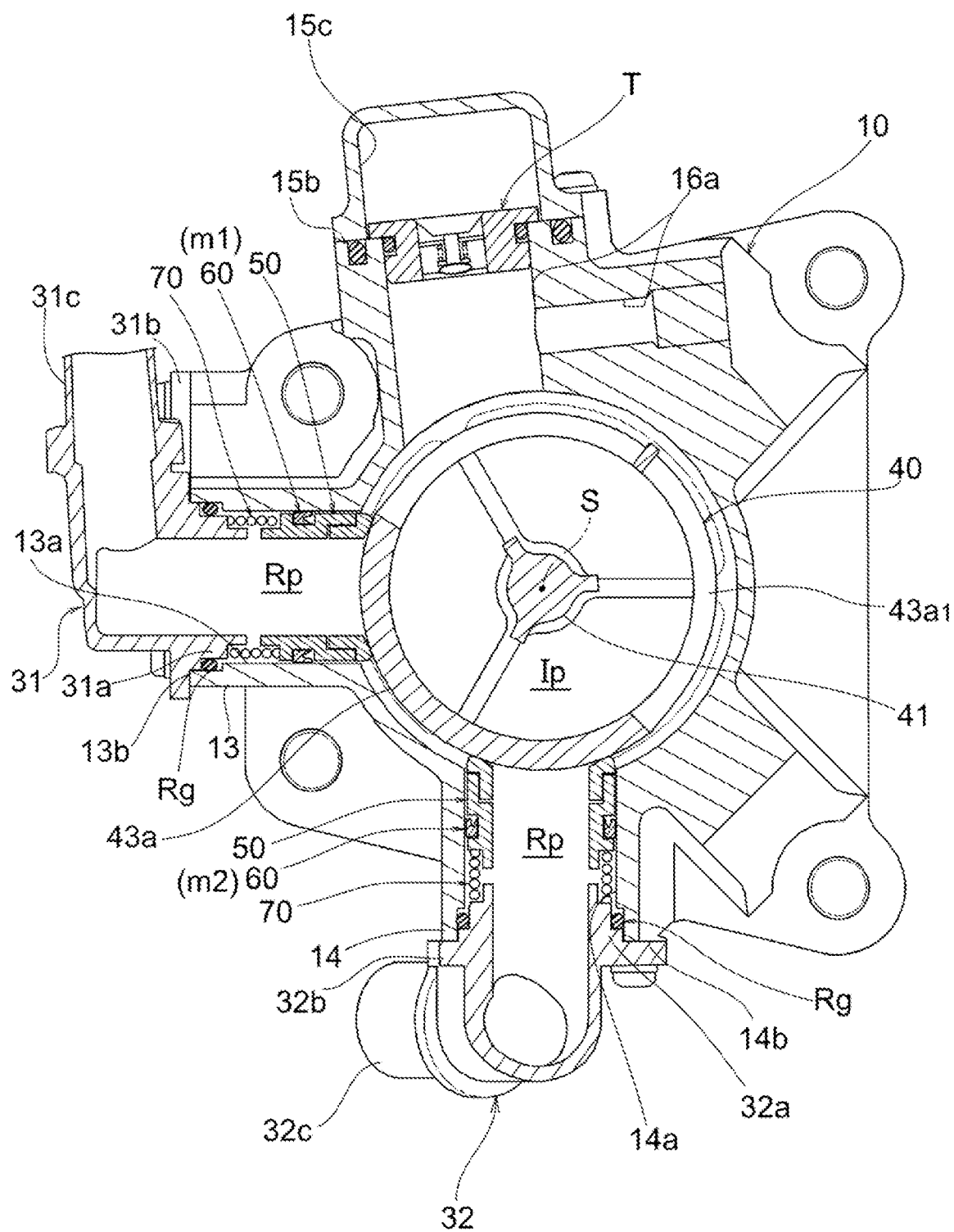
FIG. 8 is a sectional view of the rotary-type valve device along a plane that includes a center line of two passage members and that is perpendicular to the axial line, according to the embodiment.

The coupling and fitting part 13 includes an insertion hole 13a that extends in a direction that is perpendicular to the axial line S and a coupling part 13b that couples the connector member 31 as illustrated in FIGS. 4 and 8.

The insertion hole 13a is formed to define a cylindrical inner circumferential surface such that the passage module m1 can be inserted thereinto and is provided at a position at which the insertion hole 13a faces a first outer circumferential surface 43a of the valve 40 in the radial direction.

The coupling part 13b is formed such that the connector member 31 is fitted with an O ring Rg interposed therebetween and is secured using a screw.

The coupling and fitting part 14 includes an insertion hole 14a that extends in a direction that is perpendicular to the axial line S and a coupling part 14b that couples the connector member 32 as illustrated in FIGS. 4 and 8.

The insertion hole 14a is formed to define a cylindrical inner circumferential surface such that the passage module m2 can be inserted thereinto and is provided at a position at which the insertion hole 14a faces the first outer circumferential surface 43a of the valve 40 in the radial direction.

The coupling part 14b is formed such that the connector member 32 is fitted with an O ring Rg interposed therebetween and is secured using a screw.

Figure 9:
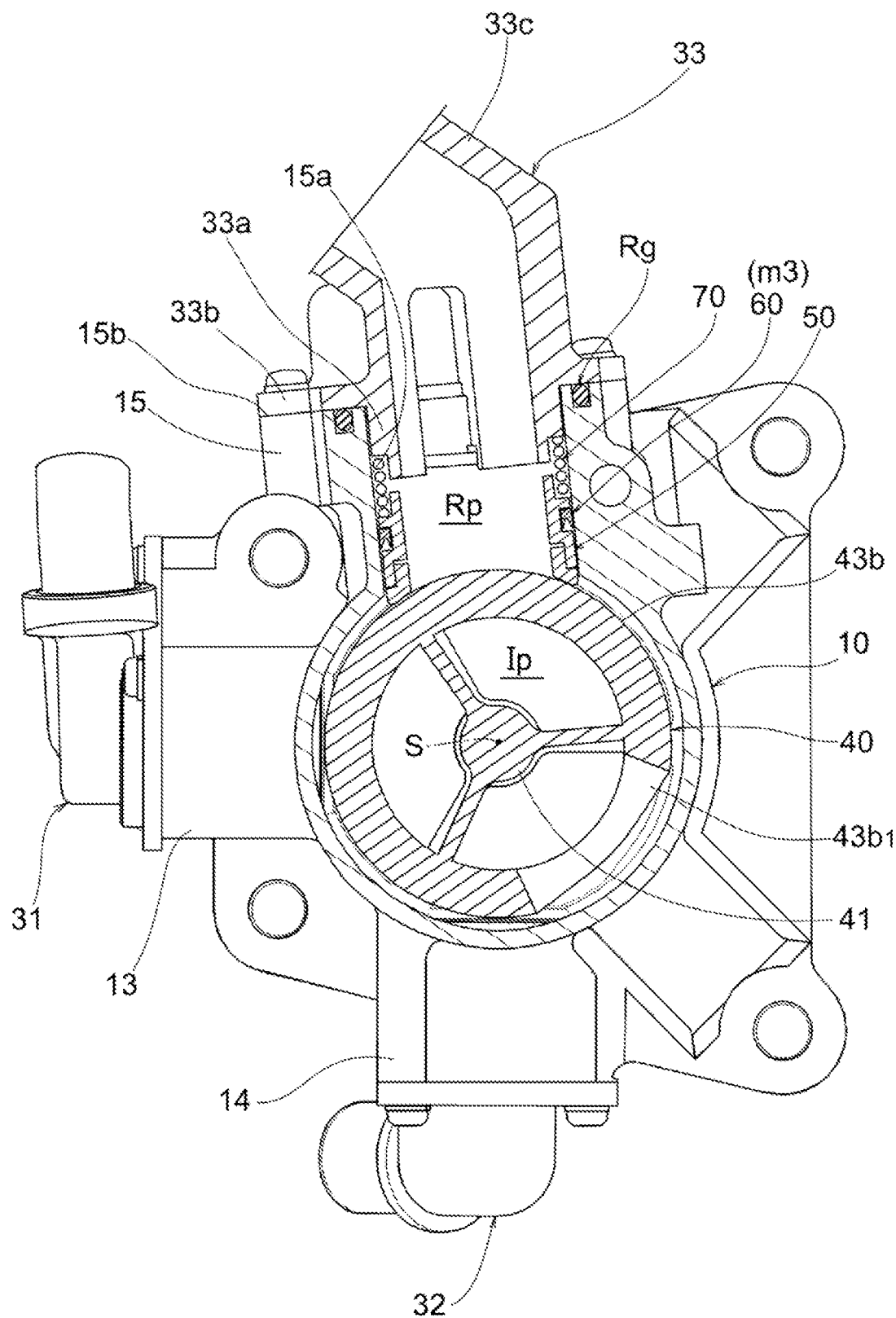
FIG. 9 is a sectional view of the rotary-type valve device along a plane that includes a center line of one passage member and that is perpendicular to the axial line, according to the embodiment.

The coupling and fitting part 15 includes an insertion hole 15a that extends in a direction that is perpendicular to the axial line S and a coupling part 15b that couples the connector member 33 as illustrated in FIGS. 4 and 9.

The insertion hole 15a is formed to define a cylindrical inner circumferential surface such that the passage module m3 can be inserted thereinto and is provided at a position at which the insertion hole 15a faces a second outer circumferential surface 43b of the valve 40 in the radial direction.

The coupling part 15b is formed such that the connector member 33 is fitted with an O ring Rg interposed therebetween and is secured using a screw.

Figure 7:
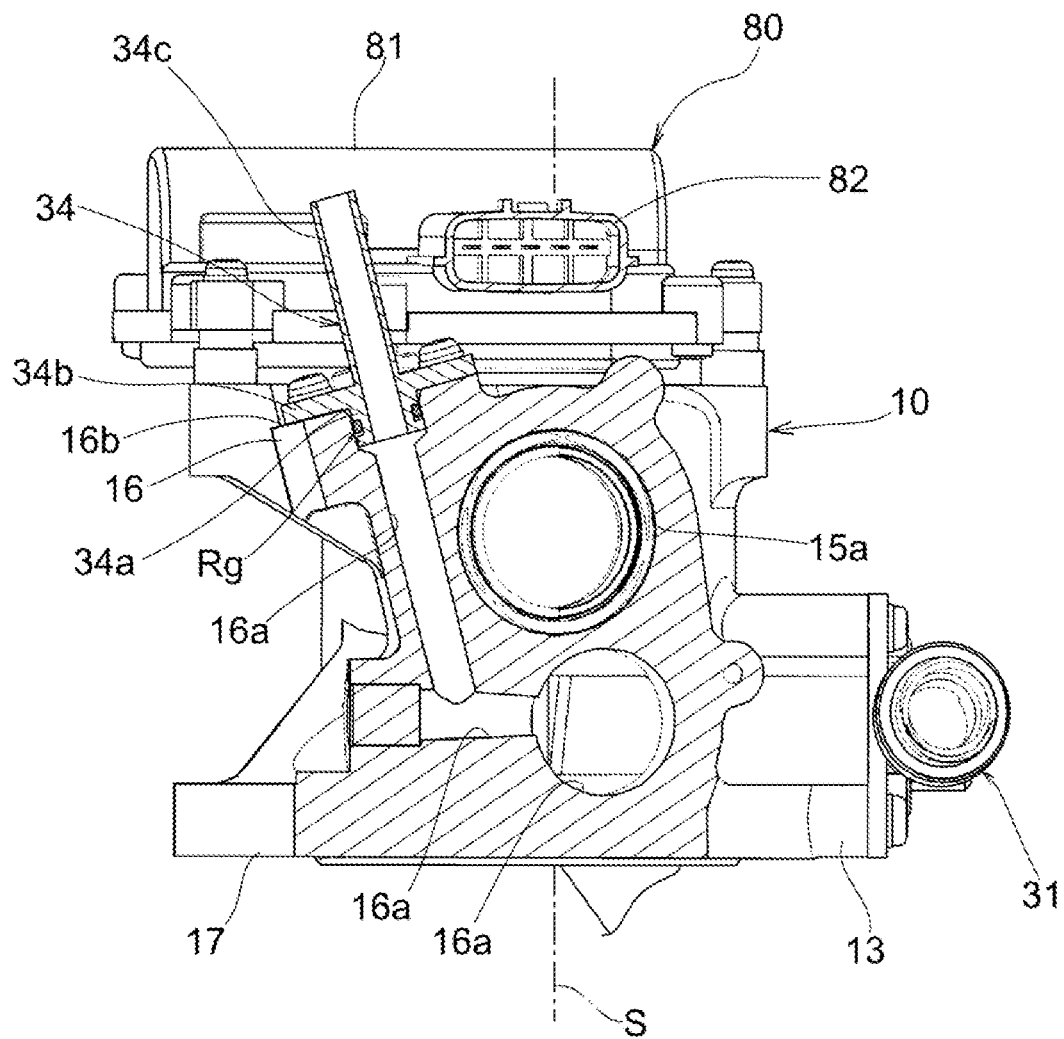
FIG. 7 is a partial sectional view of the rotary-type valve device cut at a part to which one connector member is coupled.

Also, in the vicinity of the coupling and fitting part 15, a bypass passage 15c that communicates with a midpoint of a communication passage 16a of the coupling and fitting part 16 is formed as illustrated in FIGS. 4, 7, and 8, such that the inner passage Ip and the passage of the connector member 33 communicate directly with each other through the communication passage 16a and the bypass passage 15c without the passage module m3 interposed when a thermostat T disposed in the bypass passage 15c is opened at a predetermined temperature or higher.

The coupling and fitting part 16 includes the communication passage 16a that follows a route extending in a direction that is perpendicular to the axial line S and is bent at a midpoint and a coupling part 16b that couples the connector member 34 as illustrated in FIG. 7.

The communication passage 16a is formed to include an upstream-side passage that extends in the radial direction that is perpendicular to the axial line S and faces the first outer circumferential surface 43a of the valve 40 and a downstream-side passage that is bent from the upstream-side passage and extends up to the coupling part 16b.

The coupling part 16b is formed such that the connector member 34 is fitted with an O ring Rg interposed therebetween and is secured using a screw.

Figure 3:
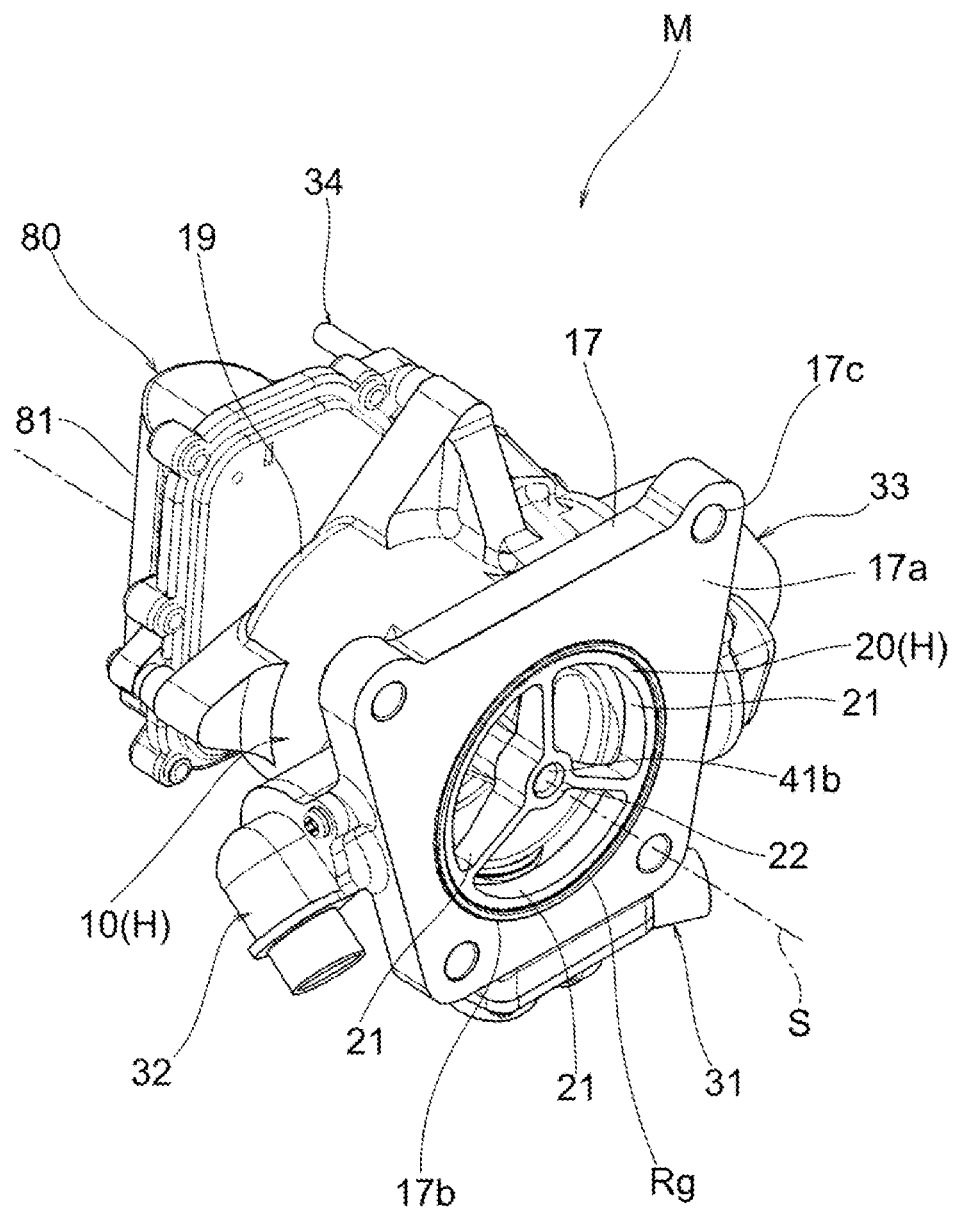
FIG. 3 is an exterior perspective view of the rotary-type valve device illustrated in FIG. 2 when seen from the side of a communication port of a housing.

The flange part 17 includes a joined surface 17a that is joined to an attachment surface of the engine E, a circular hole 17b around the axial line S, and a through-hole 17c through which a bolt fastened to the engine E is caused to pass, as illustrated in FIG. 3.

Figure 5:
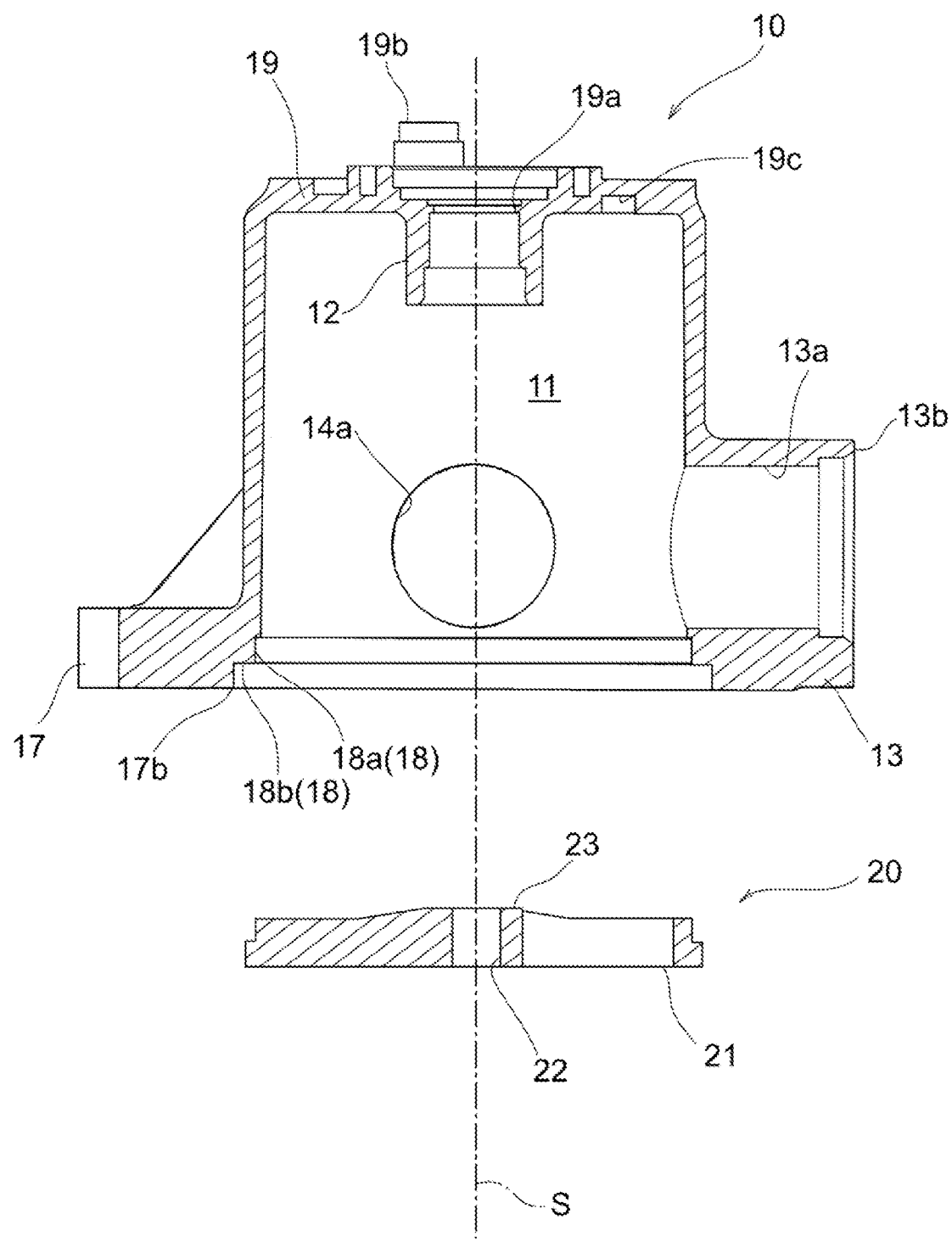
FIG. 5 is an exploded sectional view of a housing main body and a coupling member that configure the housing illustrated in FIG. 4 along a plane including an axial line.

The fitting recessed part 18 is formed inside the circular hole 17b of the flange part 17 and includes a first annular recessed part 18a and a second annular recessed part 18b as illustrated in FIG. 5.

The first annular recessed part 18a is formed such that the coupling member 20 is fitted thereinto and is coupled to the housing main body 10.

The second annular recessed part 18b is formed such that the O ring Rg is fitted in around the coupling member 20.

The partitioning wall 19 includes an opening part 19a that causes the accommodation chamber 11 to communicate with the outside through the tubular part 12, a boss part 19b that is formed outside to fasten the drive unit 80 using a screw, and an arc-shaped restriction groove 19c that is formed inside to receive a projection 46 of the valve 40 and restrict a turning range of the valve 40, as illustrated in FIGS. 4 and 5.

The coupling member 20 is formed using a resin material, an aluminum material, or the like and includes three communication ports 21, a support hole 22, and a thrust receiving part 23 as illustrated in FIGS. 3, 5 and 6.

The communication ports 21 are adapted to cause the inner passage Ip of the valve 40 and the accommodation chamber 11 to communicate with the outside and enables flow-in and flow-out of the fluid.

The support hole 22 receives and supports the other end part 41b of the shaft 41 such that the shaft 41 can turn.

The thrust receiving part 23 is formed to project up to the inward side from the other end surface 43c of the valve 40 in the direction of the axial line S and supports the annular end surface 41c that is adjacent to the other end part 41b of the shaft 41 in the direction of the axial line S as illustrated in FIG. 6.

The coupling member 20 is fitted into and coupled to the first annular recessed part 18a of the housing main body 10 from the direction of the axial line S with the other end part 41b of the shaft 41 fitted into the support hole 22 after the one end part 41a of the shaft 41 is fitted into the tubular part 12 of the housing main body 10 via the bearing bush B and the sealing member SR.

In this manner, since the housing H is formed by the housing main body 10 having the tubular part 12 and the coupling member 20 having the communication port 21 and the support hole 22, it is possible to easily assemble the valve 40 in a pinched manner.

Figure 2:
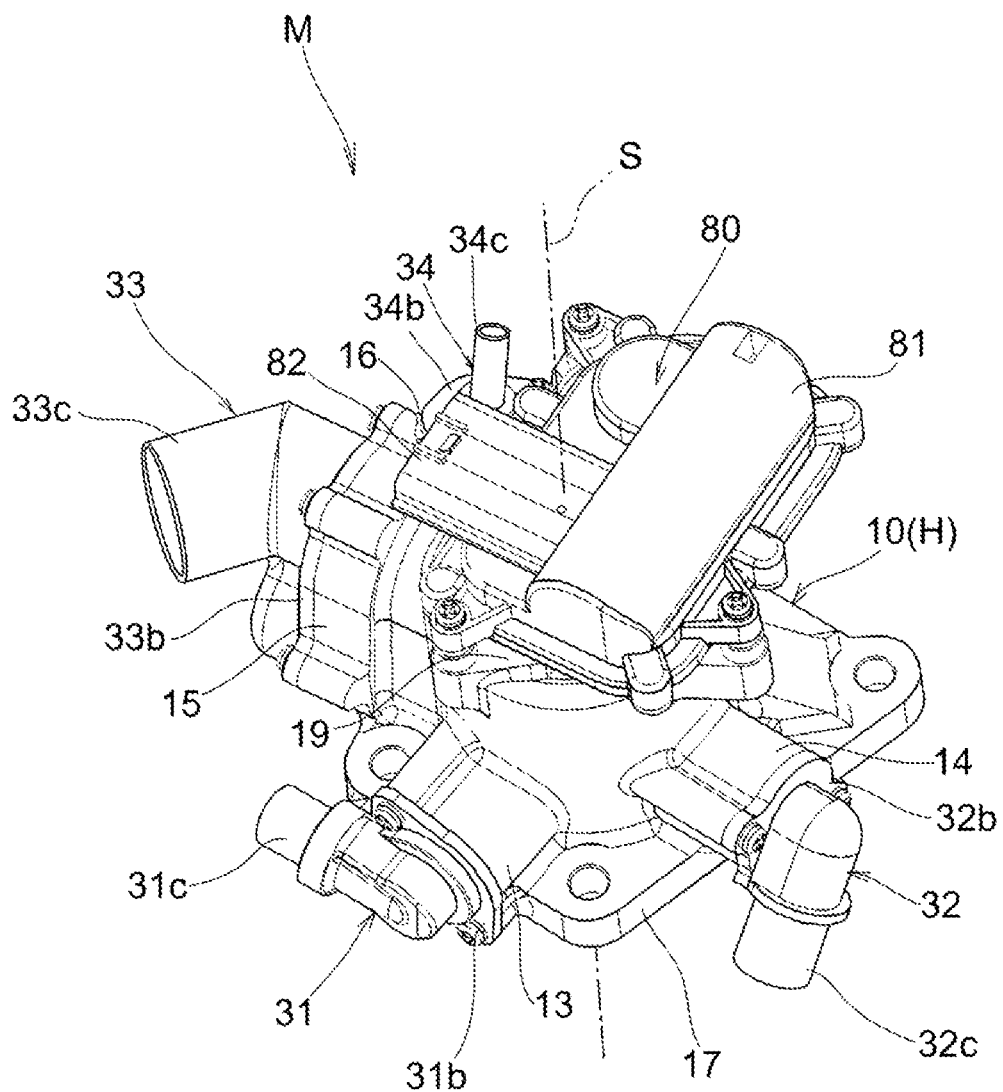
FIG. 2 is an exterior perspective view illustrating an embodiment of the rotary-type valve device according to the disclosure.
Figure 15:
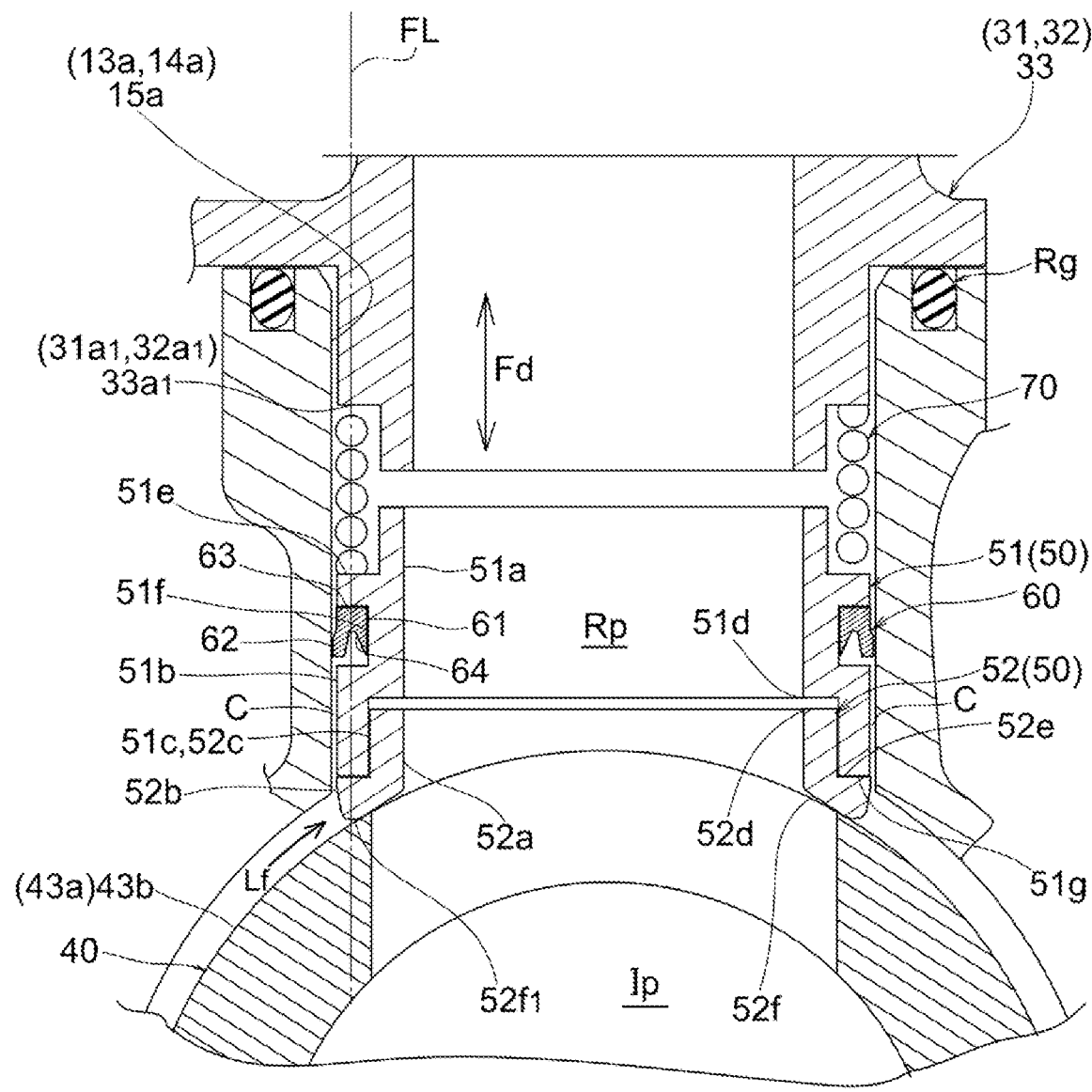
FIG. 15 is a partial sectional view illustrating an assembly state of the valve, the passage module (the passage member, the sealing member, and the biasing spring), and the connector member included in the rotary-type valve device according to the embodiment.

The connector member 31 is formed using a metal material or the like and includes a fitting part 31a, a flange part 31b, and a pipe part 31c as illustrated in FIGS. 2, 8, and 15.

The fitting part 31a has an annular spring receiving part $31a_1$ and is formed to be fitted into the insertion hole 13a of the coupling and fitting part 13, receive an end part of the biasing spring 70, and pinch the O ring Rg with the insertion hole 13a.

The flange part 31b is fastened and secured to an end surface of the coupling and fitting part 13 using a screw.

A piping that supplies cooling water to the oil cooler 4 is connected to the pipe part 31c.

The connector member 32 is formed using a metal material or the like and includes a fitting part 32a, a flange part 32b, and a pipe part 32c as illustrated in FIGS. 2, 8, and 15.

The fitting part 32a has an annular spring receiving part $32a_1$ and is formed to be fitted into the insertion hole 14a of the coupling and fitting part 14, receive an end part of the biasing spring 70, and pinch the O ring Rg with the insertion hole 14a.

The flange part 32b is fastened and secured to an end surface of the coupling and fitting part 14 using a screw.

A piping that supplies cooling water to the heater 3 is connected to the pipe part 32c.

The connector member 33 is formed using a metal material or the like and includes a fitting part 33a, a flange part 33b, and a pipe part 33c as illustrated in FIGS. 2, 9, and 15.

The fitting part 33a has an annular spring receiving part $33a_1$ and is formed to be fitted into the insertion hole 15a of the coupling and fitting part 15 and receive an end part of the biasing spring 70.

The flange part 33b is fastened and secured to an end surface of the coupling and fitting part 15 using a screw with an O ring Rg pinched therebetween.

A piping that supplies cooling water to the radiator 2 is connected to the pipe part 33c.

The connector member 34 is formed using a metal material or the like and includes a fitting part 34a, a flange part 34b, and a pipe part 34c as illustrated in FIGS. 2 and 6.

The fitting part 34a is formed to be fitted into the communication passage 16a of the coupling and fitting part 16 and pinch the O ring Rg with the communication passage 16a.

The flange part 34b is fastened and secured to an end surface of the coupling and fitting part 16 using a screw.

A piping that supplies cooling water to the constant circulation target 5 is connected to the pipe part 34c.

The valve 40 is formed using a resin material with excellent abrasion resistance and slidability to define the inner passage Ip and includes a shaft 41 around the axial line S, an end part wall 42, and an outer circumferential wall 43, a plurality of spoke parts 44 that couple the outer circumferential wall 43 to the shaft 41, a bottomed cylindrical recessed part 45, and a projection 46 as illustrated in FIGS. 6 and 11 to 13.

The shaft 41 is formed into a columnar shape around the axial line S and includes one end part 41a, the other end part 41b, an annular end surface 41c, and a gear 41d.

The one end part 41a is formed to be surrounded by the recessed part 45 and be exposed to the outside, is fitted to the tubular part 12 of the housing main body 10 via the bearing bush B, and is supported such that the one end part 41a can turn around the axial line S.

The other end part 41b is fitted to the support hole 22 of the coupling member 20 and is supported such that the other end part 41b can turn around the axial line S.

The annular end surface 41c is formed to be adjacent to the inside of the other end part 41b in the direction of the axial line S and be disposed on the inward side from the end surface 43c of the outer circumferential wall 43 as the other end surface of the valve 40 in the direction of the axial line S.

Also, the annular end surface 41c abuts on the thrust receiving part 23 of the coupling member 20 that is a part of the housing H and is supported such that the annular end surface 41c can slide in the direction of the axial line S.

The end part wall 42 defines one end surface 42a of the valve 40 in the direction of the axial line S, is continuously formed between the outer circumferential wall 43 and the recessed part 45, an is formed to block the inner passage Ip from the one end part 41a of the shaft 41.

Also, the end part wall 42 is disposed to be adjacent to the inner surface of the partitioning wall 19 of the housing main body 10 with a clearance therebetween in an assembled state.

Since the end part wall 42 is disposed to block the one end part 41a from the inner passage Ip and be adjacent to the partitioning wall 19 in this manner, the fluid flowing from the communication port 21 to the inner passage Ip is directed to collide against the inner surface of the end part wall 42 and advance to the opening parts $43b_1$ and $43a_1$.

It is thus possible to prevent the fluid flow flowing directly into the support region of the one end part 41a and to curb or prevent leakage of the fluid from the support region.

The outer circumferential wall 43 includes a first outer circumferential surface 43a and a second outer circumferential surface 43b that are disposed with a clearance from the inner circumferential surface of the housing main body 10 and continue in the direction of the axial line S, an opening part $43a_1$ that is opened in the first outer circumferential surface 43a, an opening part $43b_1$ that is opened in the second outer circumferential surface 43b, and an end surface 43c that is the other end surface of the valve 40 in the direction of the axial line S.

The first outer circumferential surface 43a is formed into a spherical surface that has a predetermined width in the direction of the axial line S and has the center on the axial line S.

The second outer circumferential surface 43b is formed into a spherical surface that has a width that is larger than that of the first outer circumferential surface 43a in the direction of the axial line S and has the center on the axial line S.

The opening part $43a_1$ is formed as a long hole that is opened in the region of the first outer circumferential surface 43a of the outer circumferential wall 43 from the inner passage Ip toward the outward side in the radial direction and that is long in the circumferential direction around the axial line S.

The opening part $43b_1$ is formed as a long hole that is opened in the region of the second outer circumferential surface 43b of the outer circumferential wall 43 from the inner passage Ip toward the outward side in the radial direction, that has a dimension that is shorter than the opening part $43a_1$, and that is longer in the circumferential direction around the axial line S.

The end surface 43c is disposed to face the inner surface of the coupling member 20 with a clearance therebetween in an assembled state.

The spoke parts 44 are formed to discretely couple the outer circumferential wall 43 to the shaft 41 such that the inner passage Ip communicates with the outside from the end surface 43c in the direction of the axial line S as an axial-direction passage.

The recessed part 45 is formed into a bottomed cylindrical shape that is recessed inward in the direction of the axial line S from the one end surface 42a of the valve 40 in the direction of the axial line S, surrounds the one end part 41a of the shaft 41, and causes the one end part 41a to be exposed to the outside of the end part wall 42.

In other words, the recessed part 45 is formed such that the one end part 41a of the shaft 41 is positioned on the same axis (axial line S) and is exposed in the recessed space and the tubular part 12 of the housing main body 10 is inserted thereinto with a clearance.

The projection 46 is formed to project in the direction of the axial line S from the end part wall 42 and is inserted into the restriction groove 19c of the housing main body 10 in an assembled state. Moreover, the projection 46 plays a role in restricting the turning range of the valve 40 by abutting on both ends of the restriction groove 19c.

According to the valve 40 with the aforementioned configuration, the shaft 41 is integrally formed as a part of the valve 40 using a resin material, and it is thus possible to achieve reduction of the number of components, reduction of the number of assembly processes, reduction of the number of management processes, and the like.

Also, the recessed part 45 is formed to be recessed on the inward side from the one end surface 42a in the direction of the axial line S and surround the one end part 41a of the shaft 41 and is also formed such that the tubular part 12 of the housing main body 10 is inserted into the recessed part 45 to support the one end part 41a, and it is thus possible to shorten the dimension in the direction of the axial line S and to achieve size reduction of the housing H and size reduction of the device M as compared with a form in which a shaft projecting from the end surface of the valve is supported as in the related art.

Also, the annular end surface 41c of the shaft 41 is disposed on the inward side from the end surface 43c of the valve 40 in the direction of the axial line S, and it is thus possible to reduce the amount of projection of the other end part 41b from the other end surface (end surface 43c). In other words, it is possible to shorten the dimension of the valve 40 as a whole in the direction of the axial line S and to set the dimension of the housing H in the direction of the axial line S to be short. It is thus possible to achieve size reduction of the device and an improvement in a vehicle mounting property.

Also, the recessed part 45 is formed into a bottomed cylindrical shape, the end part wall 42 is formed to continue between the outer circumferential wall 43 and the recessed part 45 and is formed to block the inner passage Ip from the one end part 41a, and it is thus possible to prevent the fluid flowing into the inner passage Ip from the communication port 21 from flowing directly into the support region of the one end part 41a and to curb or prevent leakage of the fluid from the support region.

Also, a configuration in which the one end part 41a of the shaft 41 is supported by the tubular part 12 via the bearing bush B and a drive force of the drive unit 80 is applied to the gear 41d formed outside the one end part 41a is employed, and it is thus possible to reduce the amount of overhanging from the bearing bush B to the gear 41d and to cause the shaft 41 to smoothly rotate about the axial line S.

Further, since the sealing member SR is disposed on the inward side from the bearing bush B in the direction of the axial line S between the shaft 41 and the tubular part 12, it is possible to prevent the fluid in the accommodation chamber 11 of the housing H from leaking to the outside through the tubular part 12.

Figure 10:
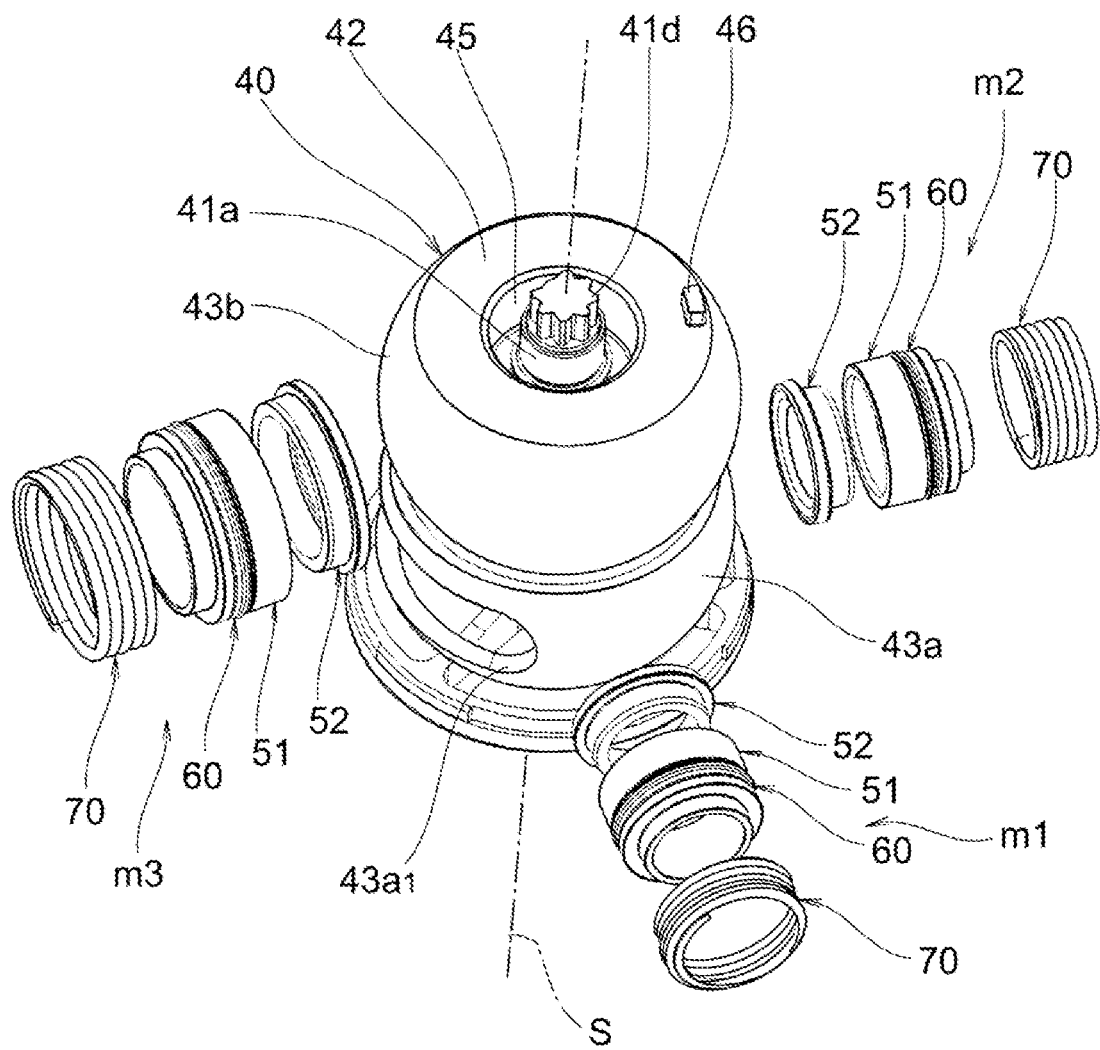
FIG. 10 is an exploded perspective view illustrating a disposition relationship of a valve and three passage modules (a passage member, a sealing member, and a biasing spring) included in the rotary-type valve device, according to the embodiment.
Figure 11:
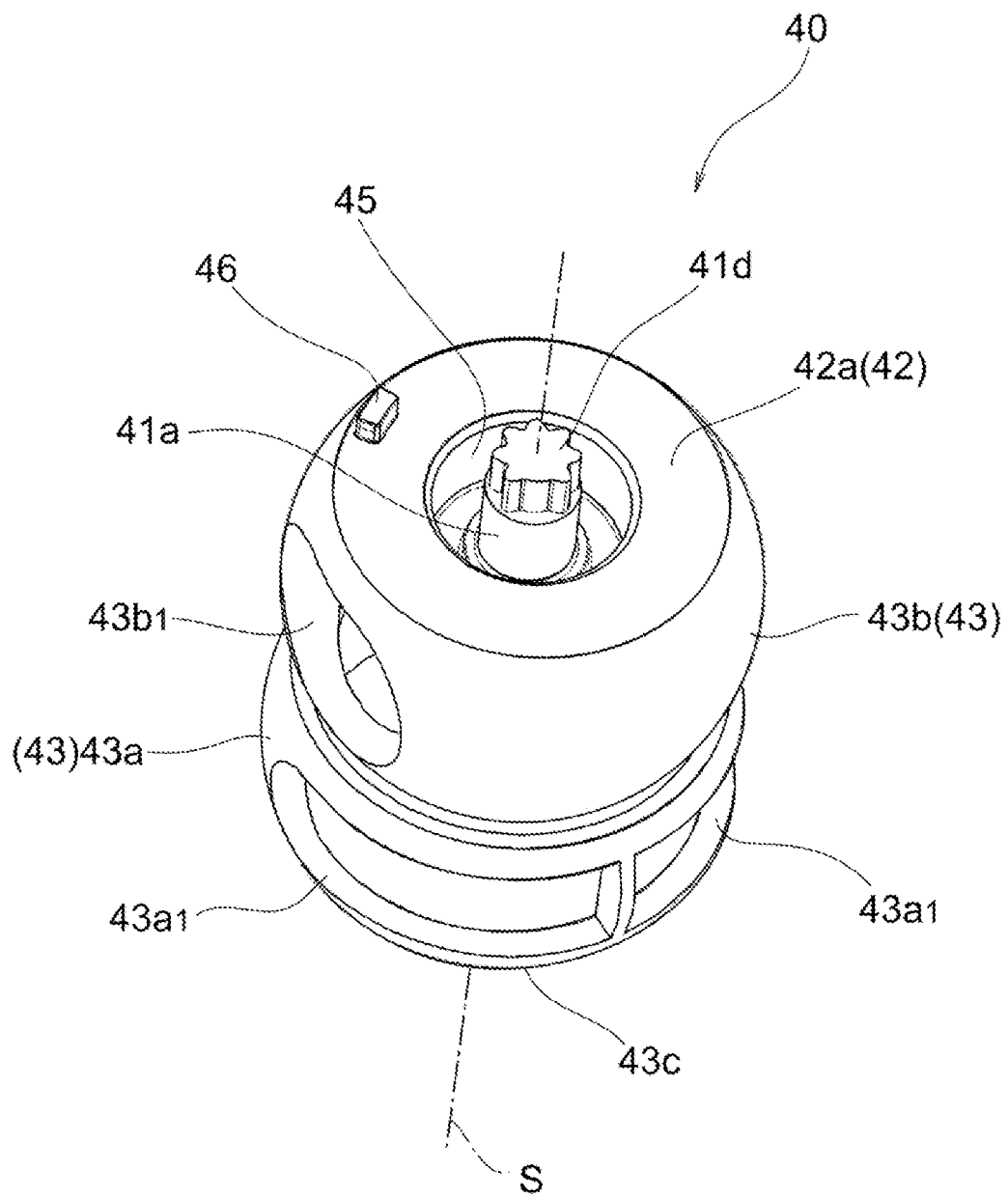
FIG. 11 is an exterior perspective view of the valve included in the rotary-type valve device when seen from the side of one end part of the shaft, according to the embodiment.
Figure 12:
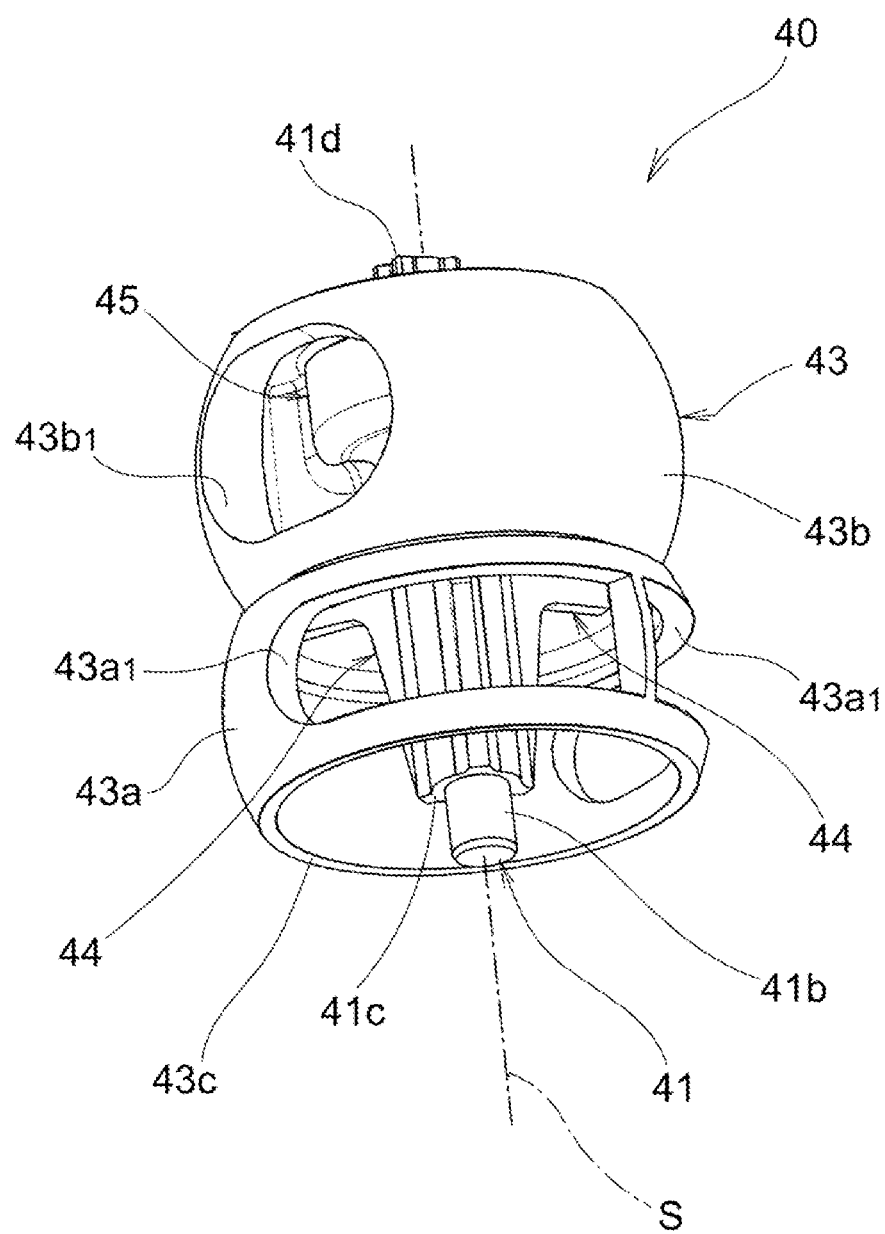
FIG. 12 is an exterior perspective view of the valve included in the rotary-type valve device when seen from the side of the other end part of the shaft, according to the embodiment.
Figure 13:
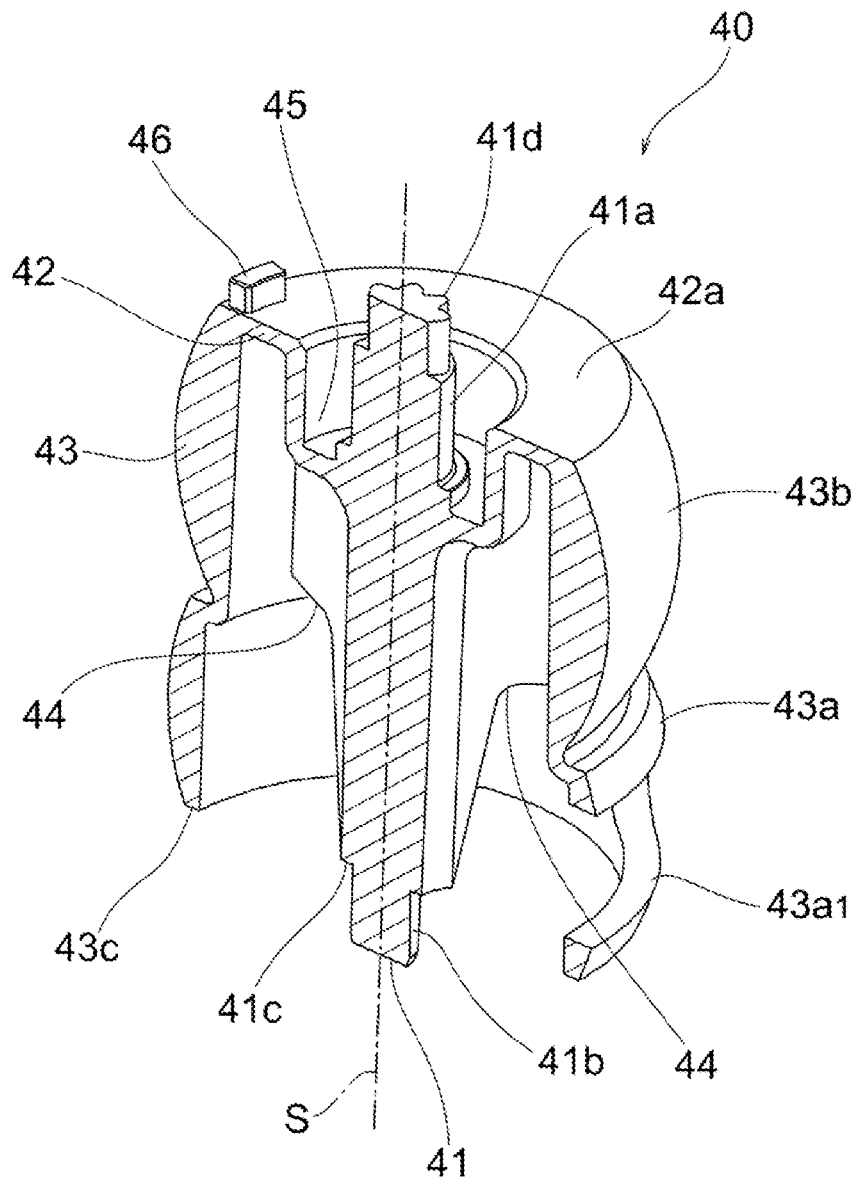
FIG. 13 is a perspective sectional view of the valve included in the rotary-type valve device cut along a plane including the axial line, according to the embodiment.
Figure 14:
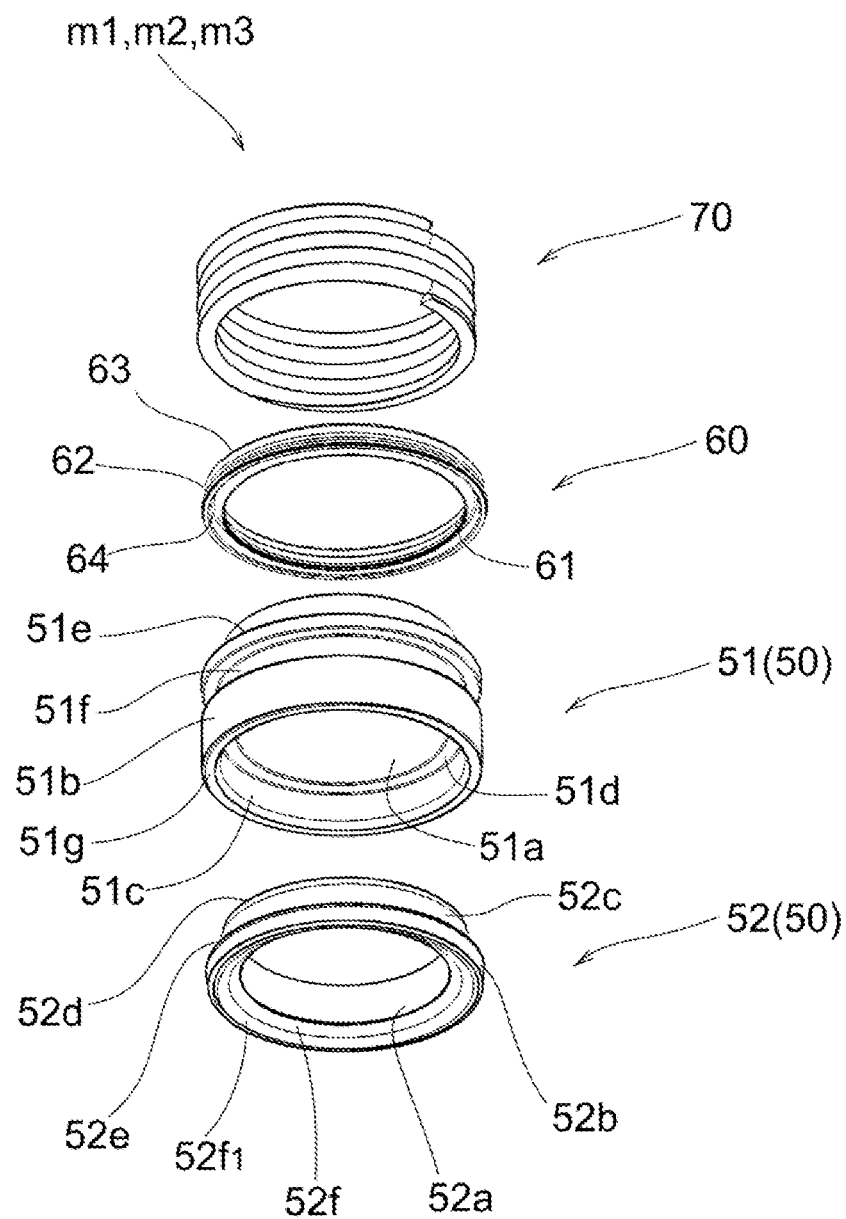
FIG. 14 is an exploded perspective view illustrating a passage module (a passage member, a sealing member, and a biasing spring) included in the rotary-type valve device, according to the embodiment.

The passage member 50 is assembled in the housing main body 10 such that the passage member 50 abuts on the outer circumferential wall 43 of the valve 40, is adapted to define the radial-direction passage Rp, is formed into a cylindrical shape as a whole as illustrated in FIGS. 10, 14, and 15, and is formed by the holder member 51 and the abutting member 52 that is held by the holder member 51 and abuts on the first outer circumferential surface 43a or the second outer circumferential surface 43b of the valve 40.

The holder member 51 intervenes between the abutting member 52 and the biasing spring 70, is adapted to hold the abutting member 52, is formed into a cylindrical shape using a thermoplastic resin material with high crystallinity, for example, a polyphenyl sulfide resin, and includes an inner circumferential surface 51a, an outer circumferential surface 51b, a fitting inner circumferential surface 51c, an annual step difference part 51d, a spring receiving part 51e, an annular groove 51f, and an annular pressurizing part 51g.

The inner circumferential surface 51a defines the radial-direction passage Rp that can communicate with the inner passage Ip of the valve 40.

The outer circumferential surface 51b is disposed with a clearance C from the insertion holes 13a, 14a, and 15a of the housing main body 10.

The fitting inner circumferential surface 51c is formed to have such a dimension that the fitting outer circumferential surface 52c of the abutting member 52 is pressure-fitted thereinto.

The annular step difference part 51d is formed at a boundary between the inner circumferential surface 51a and the fitting inner circumferential surface 51c and faces an annular end surface 52d of the abutting member 52 in a non-contact manner.

The spring receiving part 51e forms an annular end surface to receive an end part of the biasing spring 70.

The annular groove 51f is formed such that the sealing member 60 is fitted thereinto.

The annular pressurizing part 51g pressurizes an annular pressurized part 52e of the abutting member 52 via the bias force of the biasing spring 70.

The holder member 51 with the aforementioned configuration plays a role in defining the radial-direction passage Rp, a role in holding and positioning the abutting member 52 with a sealing function and transmitting the bias force of the biasing spring 70, and a role in holding and positioning the sealing member 60.

Therefore, the holder member 51 is formed using an inexpensive resin material with higher mechanical strength and rigidity than those of the abutting member 52. Alternatively, the holder member 51 may be formed using a metal material.

The abutting member 52 is formed into a cylindrical shape using a resin material, for example, a fluorine resin and includes an inner circumferential surface 52a, an outer circumferential surface 52b, a fitting outer circumferential surface 52c, an annular end surface 52d, an annular pressure-fitted part 52e, and an annular conical surface 52f.

The inner circumferential surface 52a defines the radial-direction passage Rp capable of communicating with the inner passage Ip of the valve 40.

The outer circumferential surface 52b is disposed with a clearance C from the insertion holes 13a, 14a, and 15a of the housing main body 10.

The fitting outer circumferential surface 52c is formed to have such a dimension that the fitting outer circumferential surface 52c is pressure-fitted into the fitting inner circumferential surface 51c of the holder member 51.

The annular end surface 52d faces the annular step difference part 51d of the holder member 51 in a non-contact manner in the biasing direction Fd of the biasing spring 70.

The annular pressurized part 52e is pressurized by the annular pressurizing part 51g of the holder member 51 and receives the bias force of the biasing spring 70.

The annular conical surface 52f is formed to face the first outer circumferential surface 43a or the second outer circumferential surface 43b of the valve 40 and has an annular sealing surface $52f_1$ that comes into contact with the first outer circumferential surface 43a or the second outer circumferential surface 43b in a region near the outer peripheral edge thereof with the inner circumferential-side region kept in a non-contact state.

Here, the annular sealing surface $52f_1$ is positioned on a straight line FL that is aligned with the annular pressurizing part 51g and the annular pressurized part 52e in the biasing direction Fd of the biasing spring 70.

The abutting member 52 with the aforementioned configuration plays a role in defining the radial-direction passage Rp and a role in abutting on and sealing the outer circumferential wall 43 of the valve 40 due to the bias force of the biasing spring 70 working via the holder member 51.

Therefore, the abutting member 52 is formed using a resin material with excellent abrasion resistance and slidability and with an elastic restoration property.

Here, the dimensional relationship between the holder member 51 and the abutting member 52 are set such that the length dimension of the abutting member 52 is shorter than the length dimension of the holder member 51 in the extending direction of the radial-direction passage Rp.

In other words, it is possible to increase a buckling load relative to a load of the abutting member 52 and to curb or prevent plastic deformation and settling of the abutting member 52 even if the bias force of the biasing spring 70 is applied for a long period of time, by setting the holder member 51 with high rigidity to be long and setting the abutting member 52 that enhancing sealing properties and has low rigidity to be short.

In the assembled relationship of the abutting member 52 and the holder member 51 with the aforementioned configuration, the abutting member 52 is assembled with the holder member 51 by the fitting outer circumferential surface 52c being pressure-fitted into the fitting inner circumferential surface 51c as illustrated in FIG. 15, and a strong assembled state can thus be obtained.

Also, since the abutting member 52 is assembled with the holder member 51 such that the annular step difference part 51d is kept in a non-contact state from the annular end surface 52d and the annular pressurizing part 51g pressurizes the annular pressurized part 52e, it is possible to cause the bias force of the biasing spring 70 to locally concentrate on the annular sealing surface $52f_1$ and to secure a stable sealing surface pressure.

Particularly, it is possible to cause the bias force of the biasing spring 70 to effectively act and to obtain a desired sealing surface pressure by the annular pressurizing part 51g, the annular pressurized part 52e, and the annular sealing surface $52f_1$ being aligned in line on the straight line FL on which the bias force of the biasing spring 70 acts.

The sealing member 60 is fitted into the annular groove 51f of the holder member 51, is formed into an annular shape with a substantially V or U-shaped section using a rubber material, and includes an inner circumferential surface 61, an outer circumferential surface 62, an end surface 63, and a recessed pressure receiving surface 64.

The inner circumferential surface 61 comes into close contact with the inner wall surface of the annular groove 51f of the holder member 51.

The outer circumferential surface 62 comes into close contact with the inner circumferential surfaces of the insertion holes 13a, 14a, and 15a of the housing main body 10.

The end surface 63 is formed to abut on one of side wall surfaces of the annular groove 51f of the holder member 51.

The pressure receiving surface 64 is formed such that the inner circumferential surface 61 and the outer circumferential surface 62 are widened in the radial direction in response to a pressure of the fluid that has flowed in through the clearance between the insertion holes 13a, 14a, and 15a of the housing main body 10 and the outer circumferential surface 51b of the holder member 51.

In other words, the sealing member 60 is assembled such that the pressure of the fluid acts on the pressure receiving surface 64.

Therefore, the sealing member 60 is assembled such that the pressure receiving surface 64 is directed to the inside of the housing main body 10 as illustrated in FIG. 15 in a utilization form in which the fluid flows from the inner passage Ip toward the radial-direction passage Rp as described in this embodiment.

On the other hand, the sealing member 60 is assembled such that the pressure receiving surface 64 is directed to the outward side of the housing main body 10 in the radial direction, which is a direction opposite to that in the form illustrated in FIG. 15, in a utilization form in which the fluid flows from the radial-direction passage Rp toward the inner passage Ip.

The biasing spring 70 is a compression-type coil spring, is disposed inside the insertion holes 13a, 14a, and 15a of the housing main body 10, and is disposed in a compressed state such that one end part abuts on the spring receiving part 51e of the holder member 51 and the other end part abuts on the spring receiving parts $31a_1$, $32a_1$, and $33a_1$ of the connector members 31, 32, and 33.

Moreover, the biasing spring 70 has a bias force of biasing the passage member 50 toward the valve 40 such that the annular sealing surface $52f_1$ of the abutting member 52 comes into close contact with the first outer circumferential surface 43a or the second outer circumferential surface 43b of the outer circumferential wall 43 of the valve 40.

The drive unit 80 is coupled to the partitioning wall 19 outside the housing main body 10 and has a rotational drive force acting on the valve 40 as illustrated in FIGS. 2 and 6 and includes a case 81, a connector 82 that is electrically connected to the outside, a gear 83 that is meshed with the gear 41d of the valve 40, a deceleration gear (not illustrated) with a multi-stage configuration that is meshed with the gear 83, and a motor (not illustrated) that has a drive force acting on the deceleration gear.

In this embodiment, the flow amount of the fluid flowing from the communication port 21 toward the radial-direction passage Rp through the inner passage Ip is adjusted by the rotational position of the valve 40 being appropriately adjusted by the drive unit 80.

Also, in another embodiment in a form in which the fluid flowing in from each of the connector members 31, 32, 33, and 34 flows out of the communication port 21 from the radial-direction passage Rp through the inner passage Ip, the flow amount of the fluid may be adjusted by the rotational position of the valve 40 being appropriately adjusted by the drive unit 80.

Operations of the aforementioned rotary-type valve device M will be described.

First, if the water pump 1 rotates in response to activation of the engine E, then the cooling water that is present in the cooling water circulation system is supplied from the cooling water passage in the engine E to the communication port 21 of the rotary-type valve device M and flows into the inner passage Ip and the accommodation chamber 11.

Then, the rotational position of the valve 40 is appropriately controlled and driven by the drive unit 80, and various modes for selecting whether or not to cause the inner passage Ip to communicate with the radial-direction passage Rp that is connected to the connector member 31 through the opening part $43a_1$, whether or not to cause the inner passage Ip to communicate with the radial-direction passage Rp that is connected to the connector member 32 through the opening part $43a_1$, and whether or not to cause the inner passage Ip to communicate with the radial-direction passage Rp that is connected to the connector member 33 through the opening part $43b_1$ are set.

Through the aforementioned drive and control, the cooling water that has flowed in from the communication port 21 toward the radial-direction passage Rp through the inner passage Ip is appropriately supplied from the connector member 31 toward the oil cooler 4, is appropriately supplied from the connector member 32 toward the heater 3, and is appropriately supplied form the connector member 33 toward the radiator 2.

Also, the constant circulation target 5 is constantly in a state in which the cooling water can be supplied, regardless of the rotational position of the valve 40.

As described above, in the aforementioned embodiment, the valve 40 includes the recessed part 45 that is recessed inward from the one end surface 42a in the direction of the axial line S and surrounds the one end part 41a of the shaft 41, the housing H includes the tube part 12 that is inserted into the recessed part 45 and supports the one end part 41a of the shaft 41 and the support hole 22 that supports the other end part 41b of the shaft 41 in the region near the communication port 21, and it is thus possible to shorten the length of the shaft 41 and to set the dimension of the housing H in the direction of the axial line S to be short as compared with those in the related art. It is thus possible to achieve size reduction of the device and an improvement in vehicle mounting properties.

In the aforementioned embodiment, the housing H is formed by the housing main body 10 that includes the tube part 12 and the coupling member 20 that includes the communication port 21 and the support hole 22, and it is thus possible to easily assemble the valve 40 by inserting the valve 40 into the accommodating chamber 11 of the housing main body 10, fitting the one end part 41a of the shaft 41 into the tube part 12, and fitting the other end part 41b of the shaft 41 into the support hole 22 of the coupling member 20.

In the aforementioned embodiment, the recessed part 45 is formed into a bottomed cylindrical shape, the end part wall 42 is formed continuously between the outer circumferential wall 43 and the recessed part 45 and is formed to block the inner passage Ip from the one end part 41a, and it is thus possible to prevent a fluid flowing into the inner passage Ip from the communication port 21 from flowing directly into the support region of the one end part 41a and to curb or prevent leakage of the fluid from the support region.

In the aforementioned embodiment, the shaft 41 is molded integrally with the valve 40 using a resin material, and it is thus possible to achieve reduction of the number of components, reduction of the number of assembly processes, reduction of the number of management processes, and the like. Also, since the shaft 41 is supported by the tube part 12 via the bearing bush B, the shaft 41 is supported such that the shaft 41 smoothly rotates about the axial line S even if a drive force of the drive unit 80 is applied on the distal end side thereof via the gear 41d. Further, since the sealing member SR is disposed on the inward side in the direction of the axial line from the bearing bush B between the shaft 41 and the tube part 12, it is possible to prevent the fluid in the accommodating chamber 11 of the housing H from leaking to the outside through the tube part 12.

In the aforementioned embodiment, the shaft 41 includes the annular end surface 41c that is supported in the direction of the axial line S by the thrust receiving part 23 of the coupling member 20 configuring the housing H on the inward side in the direction of the axial line S from the other end part 41b, the annular end surface 41c is disposed on the inward side from the end surface 43c that serves as the other end surface of the valve 40 in the direction of the axial line S, and it is thus possible to reduce the amount of projection of the other end part 41b from the end surface 43c.

In other words, it is possible to shorten the dimension of the valve 40 as a whole in the direction of the axial line S and to set the dimension of the housing H in the direction of the axial line S to be short. It is thus possible to achieve size reduction of the device and an improvement in vehicle mounting properties.

In the aforementioned embodiment, since the gear 41d to which a rotational force is transmitted is integrally formed at the shaft 41 on the outward side in the direction of the axial line S from the one end part 41a, it is possible to achieve reduction of the number of components, reduction of the number of assembly processes, the number of management processes, and the like.

As described above, according to the rotary-type valve device M in the aforementioned embodiment, it is possible to achieve reduction of the number of components, size reduction, an improvement in vehicle mounting properties, and the like.

Although the configuration in which the shaft 41 is integrally molded with the valve 40 has been described in the aforementioned embodiment, the disclosure is not limited thereto, and a configuration in which a separately formed shaft is assembled with the valve may be employed.

Although the case in which the recessed part 45 provided at the valve 40 is formed into a bottomed cylindrical shape has been described in the aforementioned embodiment, the disclosure is not limited thereto, and a recessed part formed into a hole opened grid shape or a recessed part in a form in which one end part of the shaft is held via a spoke connected to the outer circumferential wall may be employed as long as the recessed part is formed to be recessed on the inward side from the one end surface of the valve and surround the one end part of the shaft and is formed such that the tube part of the housing is inserted into the recessed part.

Although the configuration in which the housing H is formed by the housing main body 10 and the coupling member 20 has been described in the aforementioned embodiment, the disclosure is not limited thereto, and a housing with another form or configuration may be employed.

Although the valve 40 that includes the first outer circumferential surface 43a and the second outer circumferential surface 43b that form spherical surfaces has been described as a valve in the aforementioned embodiment, the disclosure is not limited thereto, and a valve that includes one outer circumferential surface, a valve that includes three or more outer circumferential surfaces, or a valve that has a cylindrical outer circumferential surface may be employed.

As described above, since the rotary-type valve device according to the disclosure can achieve reduction of the number of components, size reduction, an improvement in vehicle mounting properties, and the like, it is a matter of course that the rotary-type valve device can be applied to a cooling water control system for a vehicle or the like, and the rotary-type valve device is also useful for other fluid control systems that control flows of fluids.

Other Configurations

According to an embodiment of the disclosure, there is provided a rotary-type valve device including: a tubular valve that includes an inner passage and opening parts that are opened in an outer circumferential wall from the inner passage toward an outward side in a radial direction and that rotates about a predetermined axial line; a shaft that rotates integrally with the valve; a housing that accommodates the valve, supports the shaft such that the shaft is able to turn, and defines a communication port that causes the inner passage to communicate with an outside; and a passage member that is assembled in the housing such that the passage member abuts on an outer circumferential wall of the valve and defines a passage in the radial direction, in which the valve includes a recessed part that is recessed inward from one end surface in a direction of the axial line and surrounds one end part of the shaft, and the housing includes a tube part that is inserted into the recessed part and supports the one end part of the shaft and a support hole that supports the other end part of the shaft in a region near the communication port.

The aforementioned rotary-type valve device may employ a configuration in which the housing includes a housing main body that includes the tube part and a coupling member that includes the communication port and the support hole and is coupled to the housing main body in the direction of the axial line.

The aforementioned rotary-type valve device may employ a configuration in which the shaft is molded integrally with the valve using a resin material.

The aforementioned rotary-type valve device may employ a configuration in which the recessed part is formed into a bottomed cylindrical shape to cause the one end part of the shaft to be exposed, and the valve includes an end part wall that is formed continuously between the outer circumferential wall and the recessed part and blocks the inner passage from the one end part of the shaft.

The aforementioned rotary-type valve device may employ a configuration in which the tube part supports the one end part of the shaft via a bearing bush.

The aforementioned rotary-type valve device may employ a configuration in which a sealing member is disposed on an inward side in the direction of the axial line from the bearing bush between the tube part and the shaft.

The aforementioned rotary-type valve device may employ a configuration in which the shaft has an annular end surface that is supported by the housing in the direction of the axial line on an inward side in the direction of the axial line from the other end part, and the annular end surface is disposed on the inward side from the other end surface of the valve in the direction of the axial line.

The aforementioned rotary-type valve device may employ a configuration in which the shaft includes a gear to which a rotational force is transmitted on an outward side in the direction of the axial line from the one end part.

The aforementioned rotary-type valve device may employ a configuration, which includes a drive unit that is disposed outside the housing to drive and rotate the valve, in which the drive unit applies a drive force on a side of one end part of the valve.

The aforementioned rotary-type valve device may employ a configuration in which the outer circumferential wall of the valve includes a plurality of outer circumferential surfaces that are spherical and continuous in an axial direction, and the passage member is disposed to correspond to each of the outer circumferential surfaces.

According to the rotary-type valve device with the aforementioned configuration, it is possible to achieve reduction of the number of components, size reduction of the device, an improvement in vehicle mounting properties, and the like.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A rotary-type valve device, comprising:
   a tubular valve that comprises an inner passage and opening parts that are opened in an outer circumferential wall from the inner passage toward an outward side in a radial direction and that rotates about a predetermined axial line;
   a shaft that rotates integrally with the tubular valve;
   a housing that includes a housing main body and a coupling member coupled to housing main body, and is configured to accommodate the tubular valve and to, support the shaft such that the shaft is able to turn, and defines a communication port that is arranged in the coupling member and causes the inner passage to communicate with an outside, wherein the housing main body includes a partitioning wall that is opposite to the coupling member; and
a passage member that is assembled in the housing such that the passage member abuts on the outer circumferential wall of the tubular valve and is configured to define a passage in the radial direction,
wherein the tubular valve comprises a recessed part that is recessed inward from one end surface in a direction of the predetermined axial line and surrounds one end part of the shaft, and
the housing comprises a tube part that is configured to project inward from the partitioning wall in the direction of the predetermined axial line and is inserted into the recessed part and supports the one end part of the shaft and a support hole that is formed in the coupling member and next to the communication port and is configured to support an other end part of the shaft,
wherein the shaft has an annular end surface disposed on an inward side, in the direction of the predetermined axial line from the other end part, and
the coupling member comprises a thrust receiving part that is a part of the coupling member and projects towards the annular end surface from an other end surface of the tubular valve,
wherein the thrust receiving part is configured to support the annular end surface of the shaft, and
a diameter of the shaft in the tube part is larger than other parts of the shaft.

2. The rotary-type valve device according to claim 1, wherein the shaft is molded integrally with the tubular valve using a resin material.

3. The rotary-type valve device according to claim 1, wherein
the recessed part is formed into a bottomed cylindrical shape to cause the one end part of the shaft to be exposed, and
the tubular valve comprises an end part wall that is formed continuously between the outer circumferential wall and the recessed part and blocks the inner passage from the one end part of the shaft.

4. The rotary-type valve device according to claim 1, wherein the shaft comprises a gear to which a rotational force is transmitted on an outward side in the direction of the axial line from the one end part.

5. The rotary-type valve device according to claim 1, comprising: a drive unit that is disposed outside the housing to drive and rotate the tubular valve,
wherein the drive unit applies a drive force on a side of one end part of the tubular valve.

6. The rotary-type valve device according to claim 1, wherein
the outer circumferential wall of the tubular valve comprises a plurality of outer circumferential surfaces that are spherical and continuous in the direction of the axial line, and
the passage member is disposed to correspond to each of the spherical outer circumferential surfaces.

7. The rotary-type valve device according to claim 1, wherein the tube part supports the one end part of the shaft via a bearing bush.

8. The rotary-type valve device according to claim 7, wherein a sealing member is disposed on an inward side in the direction of the axial line from the bearing bush between the tube part and the shaft.

* * * * *